May 29, 1962     J. F. MOTSON     3,037,138

LIGHT SOURCE

Filed Nov. 20, 1959

INVENTOR.
JAMES F. MOTSON

BY *William E. Cleaver*

ATTORNEY

United States Patent Office 3,037,138
Patented May 29, 1962

3,037,138
LIGHT SOURCE
James F. Motson, 798 Welsh Road,
Huntingdon Valley, Pa.
Filed Nov. 20, 1959, Ser. No. 854,315
14 Claims. (Cl. 313—108)

This invention relates to electroluminescent sources of light.

The techniques for making electroluminescent wall panels or lamps are fairly well-known. The methods in general are all similar in that each technique provides a means of encapsulating electroluminescent phosphors along with activators, such as copper sulphide, copper oxide or manganese particles etc., in a layer of electrical non-conducting material; each technique provides sandwiching this dielectric layer between two electrodes; and each technique provides that an alternating electric current be applied to the two electrodes to create an alternating electrostatic field across the electroluminescent phosphors. Beyond the above-described similarity the methods differ. A common problem found in producing lamps by these techniques is that the output of light from the phosphors is not satisfactory.

There are many methods which have been attempted and suggested for increasing the light output. For instance, the two main methods used are to increase the voltage amplitude and to increase the frequency of the applied power. According to an accepted theory about the behavior of the phosphors, increasing the voltage amplitude (the strength of the electrostatic field across the phosphors being thus increased), will result in affecting more of the phosphors thereby emptying and refilling more luminescence centers in the phosphor layer during each cycle. However, when the voltage is increased beyond a certain point the dielectric properties of the encapsulating material break down and there is a risk that the lamp will become a short circuit. By increasing the frequency (according to the same theory) the luminescense centers are emptied and refilled more times for a given period and this results in increased light output. However, high frequencies will also reduce the impedance effect of the dielectric, and too fast a cycle will not allow the electrons time enough to emerge from their traps.

In the art to date it has been considered that electroluminescent light generation has its greatest efficiency when the applied voltage is in the range of 100 to 500 volts, and the applied frequency is 100 to 1000 cycles per second.

The present invention is an advance in the technique for producing greater light output from an electroluminescent lamp which can operate in the above-mentioned applied voltage range, and even lower applied frequency ranges.

It is an object of the present invention to provide an improved electroluminescent lamp.

It is a further object of the present invention to provide an electroluminescent lamp which will provide increased light output and yet necessitate only an extremely thin package.

It is a further object of the present invention to package the electroluminescent phosphors so that each phosphor is subject to the optimum electrostatic field effect between the electrodes.

It is a still further object to provide an improved dielectric layer in the electroluminescent lamp package.

It is an even further object of the present invention to provide an electroluminescent lamp which will operate with improved output on normal home electrical power.

In accordance with a feature of the present invention the electroluminescent phosphors are dusted onto the surface of a wet layer of dielectric plastic so that the phosphors are standing substantially shoulder-to-shoulder. The wet plastic is then cured and the excess phosphors are removed leaving a layer of electroluminescent phosphors, which layer will have a thickness of an electroluminescent phosphor, or substantially only one crystal (electroluminescent phosphor) high.

In accordance with another feature of the present invention the layers of dielectric plastic can be applied by at least three techniques including screen printing, dipping or rolling-on. These techniques which are used to apply the plastics to the base electrode, and to encapsulate the free ends of the partially embedded phosphors, described in the above feature, permit the acquisition of extremely thin layers of dielectric material.

In accordance with another feature of the present invention the building up of the thin layers of plastic described in the last feature is repeated with one layer on top of another when necessary, to fill in pin holes and thereby prevent electrical current paths through the dielectric.

In accordance with another feature, the base electrode has an extremely thin layer of glass applied thereto which increases the dielectric properties of the binder dielectric layer between the electrodes. This permits reducing the number of plastic layers and allows greater voltages to be applied to the thin layer of electroluminescent phosphors.

The foregoing and other objects and features of this invention will be best understood by reference to the following description of an embodiment of the invention taken in conjunction with the accompanying drawings, wherein FIG. 1(a to e) is a series of schematic diagrams showing the steps of the inventive process;

Figure 1:
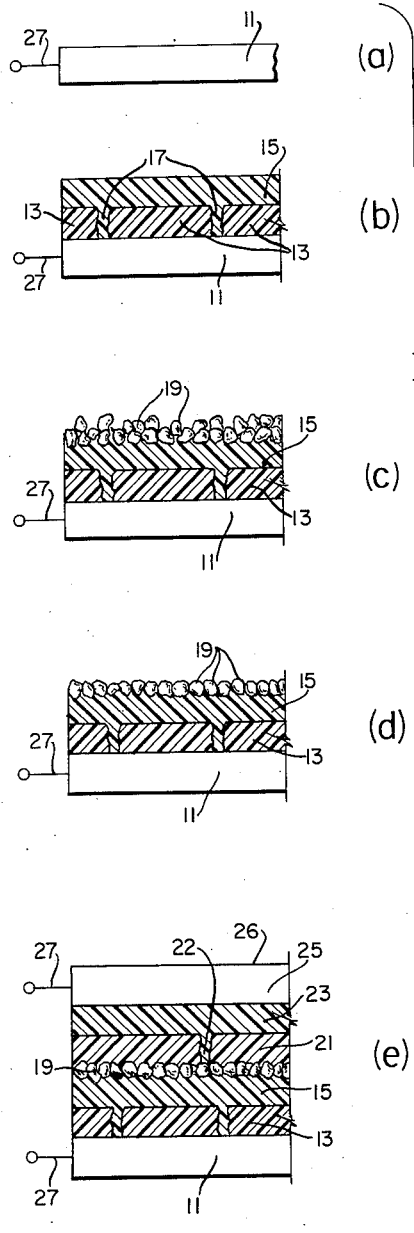

Referring to FIG. 1(a) there is shown a base electrode 11. The base electrode 11 may be any electrical conductor, for instance, Nesa glass, which is an electrical conducting glass manufactured by Pittsburgh Plate Glass Co., or a metalized surface on plastic, etc.

In a preferred embodiment the base electrode 11 is silver paint on plastic, or a thin layer of silver metal. By using silver as the base electrode the package has the advantage of reflecting back through the output surface whatever light is transmitted from the phosphors toward the base electrode 11.

FIG. 1(b) shows the addition of two thin layers 13 and 15 of plastic. The plastic material can be any of the well-known dielectric plastics such as polyesters, epoxy resins, acrylic resins, melamine resins or urea resins, etc. The plastics are held in a relatively dense solvent such as dibutyl phthalate or dimethyl phthalate which allows the plastics to be screen printed, or applied through a mesh, but which will not allow the plastic to spread too thinly. In a preferred embodiment the screen, or mesh, used in this particular plastic application technique (in screen printing the plastic) is a 304 nylon mesh which has by definition 304 squares, or openings, to the square inch. By using this screening technique the layers of plastic can be held to a thickness of .2 mil or .0002 inch. When a screening technique is employed to effect a very thin layer it has been found that pin holes such as the holes 17 depicted in FIG. 1(b) are very often present. Therefore a second layer 15 is applied by a screening technique to provide a second thin layer and yet fill in the pin holes as shown at 17 of FIG. 1(b). The actual and relative sizes of the various layers in the diagrams are obviously exaggerated in order to present an understandable illustration of the process. The layer 13 is completely cured before the layer 15 is applied. The layer 15 is not cured until after the phosphors have been added. It should be noted here that the electroluminescent phosphor material is prepared with copper oxide, or manganese activators, etc. included but is referred to throughout the specification and the claims as electroluminescent phosphors.

In addition to the screen printing technique the plastic layer 13 of FIG. 1(b) may be applied by a dipping technique. In a dipping technique the plastic is in liquid form and the base 11 is lowered into the liquid and withdrawn a predetermined rate depending on the thickness of the plastic layer to be acquired. Another technique which is often employed is that of rolling-on the plastic over the base and thereby acquiring a thin layer of plastic on the base electrode. Either of these last-mentioned techniques can be employed to obtain a layer of plastic of approximately .2 mil thick. The dipping technique has the advantage of not leaving pin holes such as the pin holes 17 and for this reason is very often considered to be a preferred technique.

The purpose of the three techniques however is the same—that is to obtain a very thin layer of plastic in which the phosphors can be encapsulated so that the electroluminescent phosphors can be subjected to the optimum electrostatic field effect.

As was suggested earlier, when plastic material is printed or applied to a surface by a screen printing technique, very often pin holes occur. Such a pin hole 22 is depicted in FIG. 1(e). To insure that all such pin holes are plugged or filled, a second thin layer of plastic 23 is applied by the screen printing technique, and as shown in FIG. 1(e), the plastic 23 fills in such a pin hole 22. The layer of plastic 23 is then completely cured. If, however, a dipping technique is used it is unlikely that pin holes 17 (or pin hole 22) will occur and then the additional layer 23 of plastic (or the layer 15) is not necessary. As further illustrated in FIG. 1(e) a second electrode element 25 is fixed, or bonded, to the layer 23. The bonding of the electrode 25 may be accomplished by simply setting the electrode into the wet layer of plastic 23 before this wet plastic is completely cured. The electrode 25 can be any translucent electrode such as Nesa glass, or such as gold metal, which has been vaporized and applied to a transparent plastic or glass base. It is necessary to have a transparent or translucent electrode in the position of electrode 25 in order to pass the light from the excited phosphors to a utility surface 26, or output surface of the lamp. It is possible to have both electrodes 25 and 11 of a transparent nature which would provide a substantially omni-directional light source. As described earlier, in a preferred embodiment, the electrode 11 is silver metal, or silver metal paint, to effect a reflection of the light back through the package and out through the utility surface of electrode 25. If relatively high voltage amplitudes and/or frequencies are to be applied additional thin layers of plastics may be added.

It has been found that by encapsulating the electroluminescent phosphors in an extremely thin package, each phosphor is subjected to the optimum effect of the alternating electrostatic field between the electrodes. The improved light output suggests that when the electroluminescent phosphors are arranged in a layer substantially one crystal in depth there is a reduction in the loss of energy by collision between the electrons from phosphor crystals of one layer and the phosphors of a second layer. By virtue of the above-described arrangement the light output of the present inventive lamp has been increased by 7 to 10 foot-lamberts.

By employing a screen printing technique in the application of the plastic material, the layers 13, 15, 21 and 23 are each built up to a thickness of approximately .2 mil, or .0002 of an inch. The crystals of electroluminescent phosphors, in a preferred embodiment, have a thickness in the range of 15 to 40 microns. If these dimensions are considered it becomes apparent that the electroluminescent phosphors would be encapsulated in a package less than 1 mil thick. If a dipping process is used to apply the plastic the layers 15 and 23 would not be necessary, making the encapsulated phosphor package less than .5 mil thick. Further, as is seen in FIG. 3 the layer covering the free ends of the phosphors needs to be only as high as the phosphors, in which case the package encapsulating the phosphors would be only approximately .25 mil in thickness.

In each of the series of diagrams of FIG. 1 the electrical terminals 27 are shown for connection to an alternating current (or an alternating current swinging around a D.-C. level) power source. Complete curing for the plastic can be effected at 200° F. for one hour.

Figure 2:
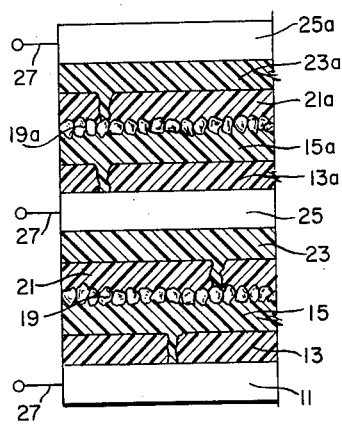
FIG. 2 is a schematic diagram of a double electroluminescent lamp.

In FIG. 2 there is shown another embodiment of the present invention. The reference numerals for the lower portion of the lamp package are identical with those in FIG. 1(e), and these layers were formed in the manner described above. A second lamp is added to the first by using the translucent electrode 25 as the base electrode upon which the second lamp portion is built. Since the plastic layers 13, 15, 21 and 23 are translucent, and since their counterparts 13a, 15a, 21a and 23a are also translucent, the light emitted from both the excited phosphor layers 19 and 19a will pass through the translucent electrode 25a. Since the basic lamp is so thin, the stacking of additional lamp packages in this fashion is not unwieldy, and the light output of such a multiple lamp is increased many times.

Figure 3:
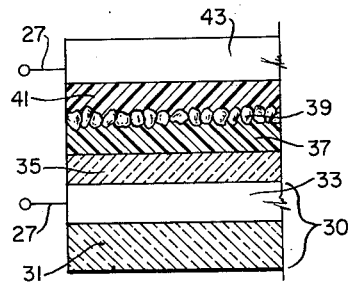
FIG. 3 is a schematic diagram of an electroluminescent lamp with a thin layer of glass added.

Referring to FIG. 3 there is shown a single lamp package with single plastic layers. The base 30, in a preferred embodiment, is Nesa glass and is represented as glass 31 and a layer 33 of metal to illustrate the electrode. Conducting glass is a combination of layers 31 and 33. Bonded to layer 33 is a thin layer 35 of glass (silicon monoxide glass). Layer 35 in a preferred embodiment is between 2 to 5 microns in thickness, and is applied to layer 33 by vaporization. The addition of the thin layer of glass 35 greatly improves the dielectric characteristic of the package. This improved dielectric allows the phosphors to be subject to greater effects of the electrostatic field since it permits a reduction in the plastic layers thereby providing a very thin package and yet permits an increase in the amplitude of the applied voltage. The plastic layer 37 is applied to the thin layer 35 of glass by a dipping process. The electroluminescent phosphors 39 are applied by a dusting technique with the excess phosphors removed as described above. The layer of plastic 41 is applied by a dipping process and it will be noted, as suggested earlier, that virtually little height is added over and above the free ends of the phosphors 39. A transparent electrode 43, such as vaporized gold metal, completes the package. With the addition of the extremely thin layer 35 of glass as just described, and the remainder of the light package intact as previously described, the output of the lamp has been increased over 10 foot-lamberts.

Figure 4:
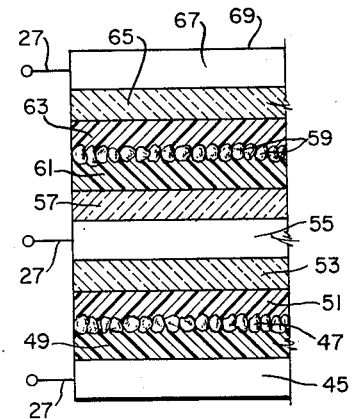
FIG. 4 is a schematic diagram of a combination double electroluminescent lamp.

FIG. 4 shows a combination double package. The base element 45 may be a metal base, a phenolic base with metal thereon, Nesa glass, etc. The electroluminescent phosphors 47 are encapsulated between the plastic layers 49 and 51 as described earlier. A layer of conductive glass is represented by the layers 52 and 55. Over the metal layer 55 there is applied an extremely thin layer of glass 57 which layer is preferably 2 to 5 microns in thickness. The single layer of electroluminescent phosphors 59 is encapsulated by single layers of plastic 61 and 63. The layer 61 is bonded to the thin layer of glass 57. Bonded to the layer 63 is a layer of glass 65 upon which there is a layer 67 of metal applied to serve as an electrode. As described earlier the layers are all extremely thin providing an over-all thin package. If the phosphors 47 and 59 are mixed respectively with different activators to provide different colors each layer can be excited separately to provide different colored lights alternatively or in a blended combination as seen from surface 69.

Further, if phenolic is used as the base 45 and the glass layer 65 is included, the package becomes quite impervious to humidity and also has some economic advantage. The lamp as shown in FIG. 3 has been tested and provides an increased light output on normal "home" electrical power, that is, 110 volts at 60 cycles.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A method of making an electroluminescent light source comprising the steps of coating a first thin layer of flowable dielectric plastic onto a selected surface of a first electrode, distributing and partially embedding electroluminescent phosphors resectively over and into the wet outer surface of said first layer of plastic, curing said first layer of plastic with said electroluminescent phosphors partially embedded therein, removing the excess electroluminescent phosphors not partially embedded therein, encapsulating said non-embedded portion of said electroluminescent phosphors with a second thin layer of flowable dielectric plastic, curing said second layer of plastic, and fixing to the outer surface of said cured second layer of plastic a translucent electrode.

2. A method of making an electroluminescent light source according to claim 1 wherein said step of distributing and partially embedding comprises the step of dusting electroluminescent phosphors onto the wet surface of said second layer of plastic.

3. A method of making an electroluminescent light source according to claim 1 wherein said step of distributing and partially embedding electroluminescent phosphors comprises the step of blowing electroluminescent phosphors onto the wet surface of said second layer of plastic.

4. A method of making an electroluminescent light source according to claim 1 wherein the steps of removing the excess electroluminescent phosphors comprises the step of briskly brushing away the excess electroluminescent phosphors.

5. A method of making an electroluminescent light source comprising the steps of coating a first thin layer of flowable dielectrc plastic onto a selected surface of a first electrode, curing said first layer of plastic, coating a second thin layer of flowable plastic onto said cured first layer of plastic, distributing and partially embedding electroluminescent phosphors respectively over and into the wet surface of said second layer of plastic, curing said second layer of plastic with said electroluminescent phosphors embedded therein, removing excess phosphors not embedded therein, coating said partially embedded phosphors with a thin third layer of flowable dielectric plastic, curing said third layer of plastic, coating said third layer of plastic with a thin fourth layer of flowable dielectric plastic, curing said fourth layer of plastic, and fixing a second translucent electrode means to the outer surface of said cured fourth layer of plastic.

6. A method of making an electroluminescent light source comprising the steps of coating a first thin layer of flowable dielectric plastic onto a selected surface of a first electrode, curing said first layer of plastic, coating a second thin layer of flowable plastic onto said cured first layer, dusting electroluminescent phosphors onto the wet outer surface of said second layer of plastic, curing said second layer of plastic having a layer of electroluminescent phosphors partially embedded therein in accordance with said dusting, brushing away the excess electroluminescent phosphors not partially embedded in said cured second layer of plastic, coating said partially embedded phosphors with a third thin layer of flowable dielectric plastic, curing said third layer of plastic, coating a fourth thin layer of flowable dielectric plastic onto the outer surface of said cured third layer of plastic, curing said fourth layer of plastic, and fixing to the outer surface of said cured fourth layer of plastic a translucent electrode.

7. A method of making an electroluminescent light source according to claim 6 wherein said coatings of each of said plastic layers comprises the applying of said plastics by a screen printing technique.

8. An electroluminescent light source comprising a first electrode, a first layer of dielectric plastic bonded to said first electrode, a plurality of electroluminescent phosphors arranged substantially packed over the surface of said first layer of plastic and partially embedded shoulder to shoulder therein, said electroluminescent phosphors forming a layer having a thickness of substantially one electroluminescent phosphor crystal high, a second layer of dielectric plastic material encapsulating the non-embedded portions of said plurality of phosphors, a second electrode having translucent characteristics bonded to said second layer of plastic, and means coupled to said first and second electrodes for connection to a power source.

9. An electroluminescent light source comprising a first electrode means, a first thin layer of dielectric plastic fixed to said first electrode, a second thin layer of dielectric plastic fixed to said first layer of plastic, a plurality of electroluminescent phosphors deposited so as to substantially cover the outer surface of said second layer of plastic and so as to be partially embedded therein, said plurality of electroluminescent phosphors standing substantially shoulder to shoulder forming a layer thereof having a thickness of one electroluminescent phosphor crystal high, a third thin layer of dielectric plastic encapsulating the portions of said phosphors not embedded in said second layer of plastic, a fourth thin layer of plastic fixed to the outer surface of said third layer of plastic, a second electrode means having translucent characteristics fixed to the fourth layer of plastic, and means coupled to said first and second electrodes for connection to a power source.

10. An electroluminescent light source according to claim 9 wherein each of said layers of dielectric plastic are approximately $2/10$ of a mil in thickness.

11. An electroluminescent light source according to claim 9 wherein said first electrode has translucent characteristics.

12. An electroluminescent light source according to claim 9 wherein siad first electrode comprises a plastic member with silver metal paint thereon.

13. An electroluminescent light source comprising a first translucent electrode having a conducting surface, a thin layer of glass bonded to said conducting surface of said first electrode, a first layer of dielectrc plastic bonded to said thin layer of glass, a plurality of electroluminescent phosphors arranged substantially packed over the surface of said first layer of plastic and partially embedded shoulder to shoulder therein, said electroluminescent phosphors forming a layer having a thickness of substantially one electroluminescent phosphor crystal high, a second layer of dielectric plastic material encapsulating the non-embedded portions of said plurality of phosphors, a second electrode bonded to said second layer of plastic, and means coupled to said first and second electrodes for connection to a power source.

14. An electroluminescent light source according to claim 13 wherein said thin layer of glass is between 2 to 5 microns thick.

References Cited in the file of this patent

UNITED STATES PATENTS 2,798,821 Lehmann _____ July 9, 1957
2,834,903 Roberts _____ May 13, 1958

(Other references on following page)

UNITED STATES PATENTS

| | | |
|---|---|---|
| 2,837,660 | Orthuber et al. | June 3, 1958 |
| 2,851,374 | Dombroski | Sept. 9, 1958 |
| 2,881,344 | Michlin | Apr. 7, 1959 |
| 2,900,271 | MacIntyre et al. | Aug. 18, 1959 |
| 2,901,651 | Destriau | Aug. 25, 1959 |

OTHER REFERENCES

The New Phenomenon of Electrophotoluminescence and its Possibilities for Investigating Crystal Lattice, by Prof. G. Destriau, Philosophical Magazine, Ser. 7, v. 38 N285, pages 712, 713, October 1947.